US011267191B2

(12) United States Patent
Wang et al.

(10) Patent No.: US 11,267,191 B2
(45) Date of Patent: Mar. 8, 2022

(54) METHODS FOR COMPOSITE PART MANUFACTURING

(71) Applicant: GM Global Technology Operations LLC, Detroit, MI (US)

(72) Inventors: Yucong Wang, West Bloomfield, MI (US); David M. Zini, Novi, MI (US); Qigui Wang, Rochester Hills, MI (US); Brennon L. White, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 325 days.

(21) Appl. No.: 16/405,471

(22) Filed: May 7, 2019

(65) Prior Publication Data

US 2020/0353671 A1 Nov. 12, 2020

(51) Int. Cl.
| | |
|---|---|
| *B29C 64/118* | (2017.01) |
| *B29L 15/00* | (2006.01) |
| *B33Y 30/00* | (2015.01) |
| *B33Y 10/00* | (2015.01) |
| *B29C 64/209* | (2017.01) |
| *B33Y 80/00* | (2015.01) |

(52) U.S. Cl.
CPC .......... *B29C 64/118* (2017.08); *B29C 64/209* (2017.08); *B29L 2015/003* (2013.01); *B33Y 10/00* (2014.12); *B33Y 30/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 6,626,261 | B1* | 9/2003 | Kurokawa | B62D 5/0409 180/444 |
| 2003/0236588 | A1* | 12/2003 | Jang | C04B 35/62873 700/119 |
| 2014/0328964 | A1* | 11/2014 | Mark | B29C 64/393 425/166 |
| 2017/0173868 | A1* | 6/2017 | Mark | B29C 64/106 |
| 2017/0259502 | A1* | 9/2017 | Chapiro | B33Y 10/00 |
| 2018/0321659 | A1* | 11/2018 | Dasappa | G05B 19/4099 |

* cited by examiner

*Primary Examiner* — Matthew J Daniels
*Assistant Examiner* — Paul Spiel
(74) *Attorney, Agent, or Firm* — Quinn IP Law

(57) ABSTRACT

An additive manufacturing method includes providing a first composite material and forming a composite part matrix using the first composite material and defining a first layer, applying a first fiber reinforcing material to the composite part matrix atop and in contact with the first layer of the composite part matrix such that fibers of the first fiber reinforcing material are oriented in a first direction and form a second layer on the composite part matrix, applying a second fiber reinforcing material to the composite part matrix atop and in contact with the first fiber reinforcing material such that fibers of the second fiber reinforcing material are oriented in a second direction orthogonal to the first direction and form a third layer on the composite part matrix, applying the first composite material to the composite part matrix, and curing the composite part matrix to create a composite product.

18 Claims, 2 Drawing Sheets

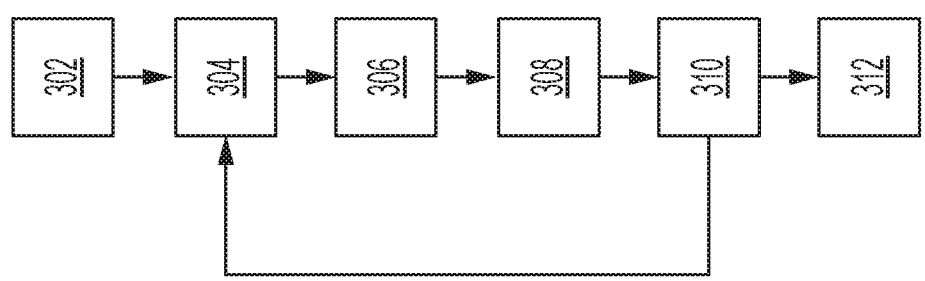
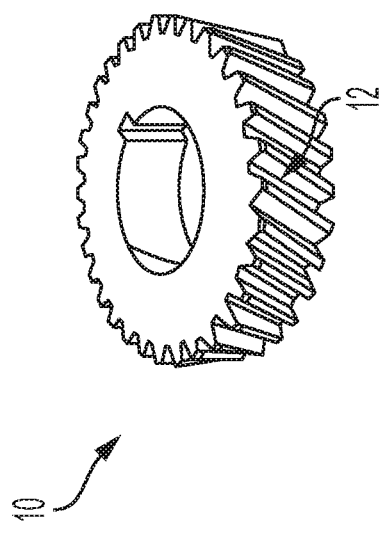
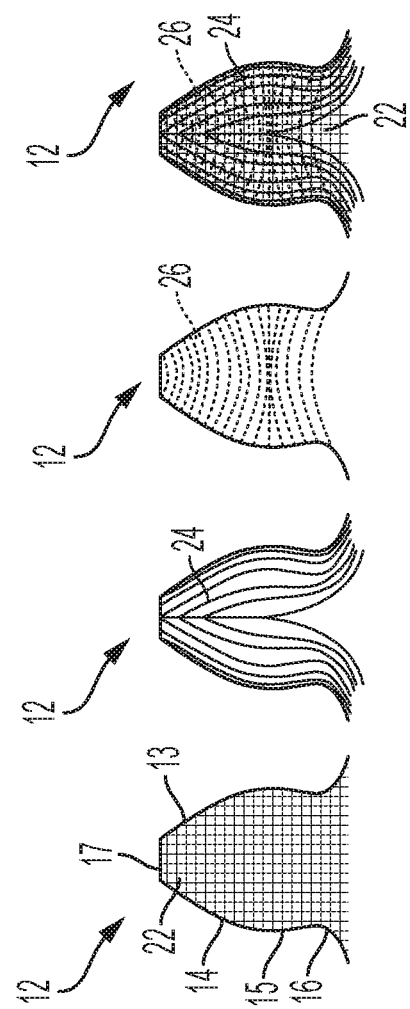
FIG. 1  FIG. 2A  FIG. 2B  FIG. 2C  FIG. 2D  FIG. 3

METHODS FOR COMPOSITE PART MANUFACTURING

INTRODUCTION

The present disclosure relates generally to additive manufacturing for producing composite parts.

Three-dimensional printing (3DP) is an additive manufacturing (AM) process of building up a component layer by layer. 3DP works by depositing a relatively small amount of material at a time, much like a printer deposits a very small amount of ink at a time to produce a single layer of print on a sheet of paper. To borrow this printing analogy, one can think of 3DP as a process of adding successive layers of "ink" (or whatever material is used) on top of each other. The material used in 3DP is typically a thermoplastic material which is melted (or is already in liquid form) and is injected or deposited in very small amounts at a time onto a substrate or platen as a first layer. The deposited material solidifies, dries or sets immediately after deposition, and the small depositions are deposited very closely together so as to merge or bond together to form a continuous layer. That is, as a layer is constructed by depositing thousands of small depositions side-by-side, adjacent depositions merge or bond together to form a continuous layer. This continuity between depositions occurs not only within each layer, but also between adjacent layers. Thus, when a successive layer is deposited upon a preceding/underlying layer, the depositions of the successive/top layer will merge or bond with the adjacent depositions of the preceding/underlying layer.

SUMMARY

Embodiments according to the present disclosure provide a number of advantages. For example, embodiments according to the present disclosure enable production, using additive manufacturing, of a component with a composite structure consisting of reinforced phases with optimized distribution and orientation. In various embodiments, the layers of reinforced phase material are oriented substantially orthogonally to provide increased strength and durability.

An additive manufacturing method according to the present disclosure includes providing a first composite material and forming a composite part matrix using the first composite material and defining a first layer and providing a first fiber reinforcing material and a second fiber reinforcing material. The method includes applying the first fiber reinforcing material to the composite part matrix, the first fiber reinforcing material applied atop and in contact with the first layer of the composite part matrix such that fibers of the first fiber reinforcing material are oriented in a first direction and form a second layer on the composite part matrix. The method further includes applying the second fiber reinforcing material to the composite part matrix, the second fiber reinforcing material applied atop and in contact with the first fiber reinforcing material such that fibers of the second fiber reinforcing material are oriented in a second direction orthogonal to the first direction and form a third layer on the composite part matrix. The method additionally includes applying the first composite material to the composite part matrix to form a fourth layer on the composite part matrix and curing the composite part matrix to create a composite product.

In an exemplary embodiment, the method further includes repeating the steps of applying the first fiber reinforcing material, applying the second fiber reinforcing material, and applying the first composite material to the composite part matrix for a plurality of cycles.

In an exemplary embodiment, the fibers of the second fiber reinforcing material are longer than the fibers of the first fiber reinforcing material.

In an exemplary embodiment, the composite part is a gear including one or more gear teeth, each gear tooth having a tooth surface profile including a tooth face, a tooth flank, a tooth fillet, and a tooth tip, and the first fiber reinforcing material is applied to parallel to the tooth surface profile and extends into the tooth fillet.

In an exemplary embodiment, the second fiber reinforcing material forms a cross-hatch pattern with the first fiber reinforcing material.

In an exemplary embodiment, the first fiber reinforcing material is one of a carbon fiber material, glass fiber material, and ceramic fiber material.

In an exemplary embodiment, the second fiber reinforcing material is one of a carbon fiber material, glass fiber material, and ceramic fiber material.

In an exemplary embodiment, curing the composite part matrix includes applying a heat treatment to the composite part matrix.

In an exemplary embodiment, curing the composite part matrix includes applying a heat treatment and a sintering process to the composite part matrix.

In an exemplary embodiment, the first fiber reinforcing material is applied in a first distribution density and the second fiber reinforcing material is applied in a second distribution density.

In an exemplary embodiment, the second distribution density is less than the first distribution density.

In an exemplary embodiment, the second distribution density is greater than the first distribution density.

In an exemplary embodiment, the first distribution density is applied to a first area of the composite part matrix and the second distribution density is applied to a second area of the composite part matrix and the method further includes determining the first distribution density and second distribution density using finite element analysis (FEA).

In an exemplary embodiment, the first fiber reinforcing material is applied using a first nozzle of a three-dimensional (3D) printer and the second fiber reinforcing material is applied using a second nozzle of the 3D printer.

In an exemplary embodiment, the method further includes applying pressure to the composite part matrix placed within a die to pressure fill the composite part matrix with a semi-solid or liquid material to form the composite product via infiltration.

An additive manufacturing method according to the present disclosure includes providing a first composite material and forming a composite part matrix using the first composite material and defining a first layer and providing a first fiber reinforcing material and a second fiber reinforcing material. The method further includes determining a first distribution density of the first fiber reinforcing material and determining a second distribution density of the second fiber reinforcing material, wherein the second distribution density is different from the first distribution density. The method also includes applying the first fiber reinforcing material to the composite part matrix based on the first distribution density, the first fiber reinforcing material applied atop and in contact with the first layer of the composite part matrix such that fibers of the first fiber reinforcing material are oriented in a first direction and form a second layer on the composite part matrix. The method additionally includes applying the second fiber reinforcing material to the composite part matrix based on the second distribution density, the second fiber reinforcing material applied atop and in contact with the first fiber reinforcing material such that fibers of the second fiber reinforcing material are oriented in a second direction orthogonal to the first direction and form a third layer on the composite part matrix. The method also includes applying the first composite material to the composite part matrix to form a fourth layer on the composite part matrix and curing the composite part matrix to create a composite product.

In an exemplary embodiment, the first distribution density is applied to a first area of the composite part matrix and the second distribution density is applied to a second area of the composite part matrix and the method further includes determining the first distribution density and second distribution density using finite element analysis (FEA).

In an exemplary embodiment, the method further includes applying pressure to the composite part matrix placed within a die to pressure fill the composite part matrix with a semi-solid or liquid material to form the composite product via infiltration.

A composite product formed by a process according to the present disclosure includes the steps of providing a first composite material and forming a composite part matrix using the first composite material and defining a first layer and providing a first fiber reinforcing material and a second fiber reinforcing material. The process further includes determining a first distribution density of the first fiber reinforcing material and determining a second distribution density of the second fiber reinforcing material, wherein the second distribution density is different from the first distribution density. The process also includes applying the first fiber reinforcing material to the composite part matrix based on the first distribution density, the first fiber reinforcing material applied atop and in contact with the first layer of the composite part matrix such that fibers of the first fiber reinforcing material are oriented in a first direction and form a second layer on the composite part matrix. The process additionally includes applying the second fiber reinforcing material to the composite part matrix based on the second distribution density, the second fiber reinforcing material applied atop and in contact with the first fiber reinforcing material such that fibers of the second fiber reinforcing material are oriented in a second direction orthogonal to the first direction and form a third layer on the composite part matrix. The process also includes applying the first composite material to the composite part matrix to form a fourth layer on the composite part matrix and curing the composite part matrix to create the composite product.

In an exemplary embodiment, the composite product is a gear including one or more gear teeth, each gear tooth having a tooth surface profile including a tooth face, a tooth flank, a tooth fillet, and a tooth tip, and the first fiber reinforcing material is applied parallel to the tooth surface profile and extends into the tooth fillet.

BRIEF DESCRIPTION OF THE DRAWINGS

The present disclosure will be described in conjunction with the following figures, wherein like numerals denote like elements.

FIG. 1 is a perspective side view of a composite product, specifically a gear, according to an embodiment of the disclosure.

FIG. 2A is a partial side view of a first layer forming a tooth of the gear of FIG. 1, according to an embodiment of the disclosure.

FIG. 2B is a partial side view of a second layer of the tooth of the gear of FIG. 1, according to an embodiment of the disclosure.

FIG. 2C is a partial side view of a third layer of the tooth of the gear of FIG. 1, according to an embodiment of the disclosure.

FIG. 2D is a partial side view of the tooth of the gear of FIG. 1 formed by the layers illustrated in FIGS. 1A-1C, according to an embodiment of the disclosure.

FIG. 3 is a flowchart representation of an additive manufacturing method, according to an embodiment of disclosure.

Figure 4:
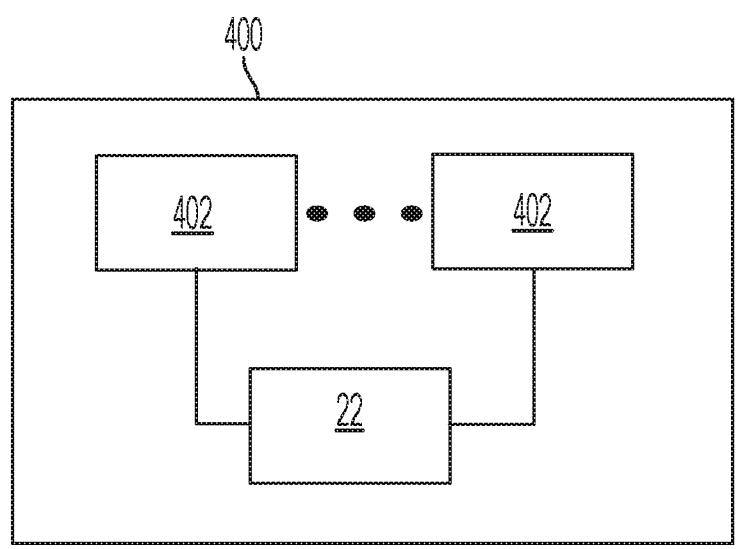
FIG. 4 is a schematic block diagram of an additive manufacturing machine or 3D printer, according to an embodiment of the disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "Left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The present disclosure includes an additive manufacturing process and product produced using the process which overcomes the limitations of previous approaches and is suitable for producing a product having a customized composite structure with reinforced phases distributed and oriented in an optimal way for high strength, stiffness, fatigue resistance, and wear resistance properties.

In one aspect, as shown in FIGS. 2A-2D, teeth of a composite gear are formed from fiber-reinforced structures, with continuous or short fibers parallel to or normal to the gear tooth surfaces. The fiber reinforcement is selected from various materials including, for example and without limitation, carbon fibers, glass fibers, ceramic particles and compounds, and intermetallics and alloys. The fiber reinforcement is selectively distributed in different locations or layers. The composite gears provide high strength, stiffness, fatigue resistance, and wear resistance properties in selected regions depending on the placement of the reinforcing fibers. In various embodiments, as discussed herein, additive manufacturing is used to generate the fiber reinforcement structures.

FIG. 1 illustrates a composite product, specifically a gear 10, formed using the additive manufacturing processes discussed herein. FIGS. 2A-2D illustrate one gear tooth 12 of the gear 10 formed using the additive manufacturing process with each figure illustrating a step of the method discussed herein. With reference to FIG. 2A, a first layer 22 forms the gear matrix. The first layer 22 is a material such as resin, polymer, metallic alloy, intermetallic, or ceramic or the like to serve as a structural component. The first layer 22 forms a tooth surface profile 13 that includes a tooth face 14, a tooth flank 15, and a tooth fillet 16, as well as a tooth tip surface 17, of the gear tooth 12.

As shown in FIG. 2B, a second layer 24 of continuous fibers is placed along the surface profile 13. In various aspects, the second layer 24 is placed substantially perpendicular to the tooth tip surface 17 such that the second layer 24 extends radially from the tooth tip surface 17. In various embodiments, the second layer 24 improves the roughness and strength of the gear tooth 12, with the amount of roughness and strength dependent on the material selected. The continuous fibers comprising the second layer 24 are oriented parallel to the tooth surface profile 13 and extend into the area of the tooth fillet 16. In various embodiments, the fiber distribution density of the second layer 24 is between approximately 5 to 50 volume percent to control stress density, or principle stresses. For example, since the tooth fillet 16 is an area of maximum bending stress concentration, a higher density placement of the second layer 24 of fibers within this area improves the area's resistance to bending stresses. In various embodiments, the second layer is applied at a different density to different areas of the composite part, such that the density of the second layer differs between the area of the tooth fillet 16, the area of the tooth flank 15, the area of the tooth face 14, and the area of the tooth tip 17. The local density of the second layer 24 of fibers is determined, in some embodiments, by finite element analysis (FEA) or hand calculation.

In various embodiments, a third layer 26 of continuous fibers is placed perpendicular to the tooth surface profile 21, as shown in FIG. 2C. The third layer 26 of fibers is substantially perpendicular to the first layer 24 of fibers to improve gear wear, among other benefits. The third layer 26 of fibers provide a cross-hatch structure to provide matrix stability. In various embodiments, the fiber distribution density of the third layer is different from the fiber density distribution of the second layer. In various embodiments, the third layer is applied at a different density to different areas of the composite part, such that the density of the third layer differs between the area of the tooth fillet 16, the area of the tooth flank 15, the area of the tooth face 14, and the area of the tooth tip 17. The local density of the third layer 26 of fibers is determined, in some embodiments, by finite element analysis.

With reference to FIG. 2D, additional layers 22, 24, 26 are applied to the gear tooth 12 to build the final gear structure. The cross-hatched or alternating structure of the layers 24, 26 along with the matrix-forming first layer 22, provide a composite structure that enables improved tensile strength, reduced localized bending stress concentration, and improved tooth roughness and strength with variable modulus.

In various embodiments, the second and third layers 24, 26 may be long or short continuous fibers. The second and third layers 24, 26 may be carbon fiber, glass fiber, ceramic fibers, or other suitable fibers or strands. The overlapping placement and alternating orientation of the layers 24, 26 forms a reinforcing structure. The placement of the layers 24, 26 may be optimized based on the desired gear tooth surface roughness, strength, wear resistance, or other properties. In various embodiments, each of the materials forming the first, second, and third layers 22, 24, 26 has a different material property. For example and without limitation, in various embodiments the first layer 22 is an inner or underlying material that has improved shock absorption and toughness properties while the second layer 24, third layer 26, and any subsequent layers form an outer skin or surface having high wear resistance characteristics.

In various embodiments, the first layer 22 is formed from a fiber-reinforced material. In other embodiments, the first layer 22 is formed from an unreinforced material. When the first layer 22 is formed from a fiber-reinforced material, the application of additional fiber reinforcing layers such as the second and third layers 24, 26 result in a composite part having a fiber density that varies both on the surface of the composite part as well as throughout or within the composite part, that is, the outside surface of the composite part has a different fiber density than the interior of the composite part. The selection of whether to use a fiber-reinforced material or an unreinforced material as the first layer 22 depends on the desired physical characteristics and wear properties of the composite part, that is high wear resistance, improved shock absorption, bending strength at key positions on the composite part, etc., for example and without limitation.

FIG. 3 illustrates an additive manufacturing method 300 in flowchart form. The additive manufacturing method 300 may be used to generate the composite gear 10 and gear tooth 12. The additive manufacturing method 300 may be performed using a 3D printer such as the printer 400 shown in FIG. 4. The printer 400 includes, in various embodiments, a plurality of nozzles 402 configured to deposit material as directed by a controller 22 in accordance with a 3D printing instruction, such as a CAD file. The controller 22 is configured to generate and transmit one or more control signals to the nozzles 402 to direct the placement of the material on the 3D-printed part. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22.

Starting at 302, a composite material is selected and used to form the composite part matrix as a first layer. The matrix material is selected from materials such as resins, polymers, and metallics, for example and without limitation. In various embodiments, the matrix material may include two or more materials in a multi-material deposition. In some embodiments, a first material of the matrix material is an inner material that has improved shock absorbing and toughness properties. In some embodiments, a second material of the matrix material forms an outer skin or layer having improved wear characteristics. In various embodiments, the matrix material is a fiber-reinforced material with the fibers oriented such that the density of fibers varies throughout the composite part matrix. In other embodiments, the matrix material is an unreinforced material.

Next, at 304, the material comprising the second layer is a fiber reinforcing material selected from materials such as fiberglass, carbon fiber, etc. for example and without limitation. The second layer is formed from capsules containing the selected material (for example, ceramic fibers such as glass or carbon with resin or plastics) placed within a nozzle 402 of the printer 400. The controller 22 generates a control signal to direct the nozzle 402 to apply the second layer to the first layer in the predetermined orientation, density, and location.

At 306, the material comprising the third layer is a fiber reinforcing material selected from materials such as fiberglass, carbon fiber, etc. for example and without limitation. In various embodiments, the third layer is comprised of longer fibers than the fibers used in the second layer. Like the second layer, the third layer is formed from capsules containing the selected material (for example, ceramic fibers such as glass or carbon with resin or plastics) placed within another nozzle 402 of the printer 400. The controller 22 generates a control signal to direct the nozzle 402 to apply the third layer to the second layer in the predetermined orientation, density, and location. In various embodiments, the third layer is comprised of a different material from the second layer material and may be applied with the same or a different fiber orientation than that used for the second layer.

Next, and optionally, at 308, additional capsulated material is applied using others of the nozzles 402, if desired. This additional material comprises a fourth, fifth, sixth, or more fiber reinforcing layer that is applied at the same orientation or at a different orientation from one or more of the second and third layers.

Optionally, at 310, matrix material such as that used in forming the first layer is applied in the unfilled areas of the 3D-printed part to generate a complete layer. This matrix material may be the same material as that used to form the first layer or the matrix material may be a different material. In various embodiments, the matrix material is a fiber-reinforced material, however, in other embodiments, the matrix material is an unreinforced material. The steps 304, 306, 308, and 310 may be repeated as often as needed to generate a 3D-printed composite part having the desired properties such as thickness, density, stress resistance, etc. In this method, the dual or multiple material printing system using the printer 400 creates the composite part one layer at a time.

Alternatively, at 310, the fiber-reinforced phase preform structure formed from the first, second, and third (or more) layers is placed within a die in a forming machine that may be separate from or included with the printer 400 to "squeeze cast" or infiltrate resin or plastic or other suitable liquid or semi-solid material to pressure fill or infiltrate the preformed structure as the matrix material to form the composite part via infiltration. This treatment is performed on preformed composite structures to increase the density and improve the strength, wear resistance, and other physical properties of the final composite part.

Next, the method 300 proceeds to 312. At 312, various finishing processes are performed to improve the mechanical properties of the composite product. For resin- or polymer-based composite products, a post heat treatment schedule is conducted to improve the mechanical properties of the composite. For metal-based composite products, heat treatment and sintering processes are performed to achieve the desired density and strength of the composite product.

As discussed herein, the fiber density of the final composite part can vary both on the surface of the composite part due to the deposition of the fiber-reinforcing layers and/or throughout the composite part due to the selection of the matrix material. The orientation and density of the fibers depends on the desired physical characteristics of the final composite product.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used; is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term. "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An additive manufacturing method, comprising:
providing a first composite material;
forming a composite part matrix using the first composite material such that the first composite material defines a first layer, wherein the composite part has a tip surface, a fillet, and a side surface extending from the tip surface to the fillet, the side surface has a surface profile, and the surface profile has a curved shape;
providing a first fiber reinforcing material and a second fiber reinforcing material;
applying the first fiber reinforcing material to the composite part matrix, the first fiber reinforcing material applied atop and in contact with the first layer of the composite part matrix such that fibers of the first fiber reinforcing material are oriented in a first direction and form a second layer on the composite part matrix;
applying the second fiber reinforcing material to the composite part matrix, the second fiber reinforcing material applied atop and in contact with the first fiber reinforcing material such that fibers of the second fiber reinforcing material are oriented in a second direction orthogonal to the first direction and form a third layer on the composite part matrix, wherein the fibers of the second fiber reinforcing material extend from the tip surface to the fillet of the composite part, and the fibers of the second fiber reinforcing material are continuous fibers, and a shape of the continuous fibers is the same as the curved shape of the surface profile such that the fibers of the second fiber reinforcing material are parallel to the surface profile;
applying the first composite material to the composite part matrix to form a fourth layer on the composite part matrix; and
curing the composite part matrix to create a composite product.

2. The method of claim 1 further comprising repeating the steps of applying the first fiber reinforcing material, applying the second fiber reinforcing material, and applying the first composite material to the composite part matrix for a plurality of cycles, wherein the first fiber reinforcing material is different from the second fiber reinforcing material, the third layer is formed by a third fiber reinforcing material, the third fiber reinforcing material is different from the second fiber reinforcing material, the fibers of the fiber reinforcing material includes a plurality of longitudinal fibers and a plurality of transverse fibers, and each of the plurality of longitudinal fibers is perpendicular to the each of the plurality of transverse fibers such that the fibers of the first reinforcing material form a grid shape.

3. The method of claim 1, wherein the fibers of the second fiber reinforcing material are longer than the fibers of the first fiber reinforcing material.

4. The method of claim 2, wherein the composite composite product is a gear comprising one or more gear teeth, each gear tooth having a tooth surface profile including a tooth face, a tooth flank, a tooth fillet, and a tooth tip, and the first fiber reinforcing material is applied parallel to the tooth surface profile and extends into the tooth fillet, the tooth fillet is the fillet of the composite product, the tooth tip is the tip of the composite product, and the tooth surface profile is the surface profile of the composite product.

5. The method of claim 4, wherein the second fiber reinforcing material forms a cross-hatch pattern with the first fiber reinforcing material, wherein the third layer includes a plurality of third fibers, the plurality of third fibers includes a first group of third fibers, a second group of second fibers, and a single straight fiber, the side surface is a first side surface, the composite part includes a second side opposite to the first side surface, the second side surface is spaced apart from the first side surface along a transverse direction, the tip surface is spaced apart from the fillet along a longitudinal direction, the longitudinal direction is perpendicular to the transverse direction, each of the first group of third fibers has a concave up shape with respect to the longitudinal direction, each of the second group of third fibers has a concave down shape with respect to the longitudinal direction, the single straight has a straight shape and is elongated along the transverse direction, each of the plurality of longitudinal fibers is elongated along the longitudinal direction, and each of the plurality of transverse fibers is elongated along the transverse direction.

6. The method of claim 5, wherein the first fiber reinforcing material is one of a carbon fiber material, glass fiber material, and ceramic fiber material, the first fiber reinforcing material has a first material property, the second fiber reinforcing material has a second material property, the first material property is different from the first material property, the third layer is formed by a third fiber reinforcing material, the third fiber reinforcing material has a third material property, and the third material property is different from the first material property and the second material property.

7. The method of claim 1, wherein the second fiber reinforcing material is one of a carbon fiber material, glass fiber material, and ceramic fiber material.

8. The method of claim 1, wherein curing the composite part matrix comprises applying a heat treatment to the composite part matrix.

9. The method of claim 1, wherein curing the composite part matrix comprises applying a heat treatment and a sintering process to the composite part matrix.

10. The method of claim 1, wherein the first fiber reinforcing material is applied in a first distribution density and the second fiber reinforcing material is applied in a second distribution density.

11. The method of claim 10, wherein the second distribution density is less than the first distribution density, and the second distribution density is between 5 and 50 volume percent.

12. The method of claim 10, wherein the second distribution density is greater than the first distribution density.

13. The method of claim 10, wherein the first distribution density is applied to a first area of the composite part matrix and the second distribution density is applied to a second area of the composite part matrix and the method further includes determining the first distribution density and second distribution density using finite element analysis (FEA).

14. The method of claim 1, wherein the first fiber reinforcing material is applied using a first nozzle of a three-dimensional (3D) printer and the second fiber reinforcing material is applied using a second nozzle of the 3D printer.

15. The method of claim 1, further comprising applying pressure to the composite part matrix placed within a die to pressure fill the composite part matrix with a semi-solid or liquid material to form the composite product via infiltration.

16. An additive manufacturing method, comprising:
providing a first composite material;
forming a composite part matrix using the first composite material such that the first composite material defines a first layer;
providing a first fiber reinforcing material and a second fiber reinforcing material;
determining a first distribution density of the first fiber reinforcing material;
determining a second distribution density of the second fiber reinforcing material, wherein the second distribution density is different from the first distribution density;
applying the first fiber reinforcing material to the composite part matrix based on the first distribution density, the first fiber reinforcing material applied atop and in contact with the first layer of the composite part matrix such that fibers of the first fiber reinforcing material are oriented in a first direction and form a second layer on the composite part matrix;
applying the second fiber reinforcing material to the composite part matrix based on the second distribution density, the second fiber reinforcing material applied atop and in contact with the first fiber reinforcing material such that fibers of the second fiber reinforcing material are oriented in a second direction orthogonal to the first direction and form a third layer on the composite part matrix;
applying the first composite material to the composite part matrix to form a fourth layer on the composite part matrix; and
curing the composite part matrix to create a composite product;
wherein the composite part has a tip surface, a fillet, and a side surface extending from the tip surface to the fillet, the side surface has a surface profile, and the surface profile has a curved shape;
wherein the fibers of the second fiber reinforcing material extend from the tip surface to the fillet of the composite part, the fibers of the second fiber reinforcing material are continuous fibers, and a shape of the continuous fibers is the same as the curved shape of the surface profile such that the fibers of the second fiber reinforcing material are parallel to the surface profile.

17. The method of claim 16, wherein the first distribution density is applied to a first area of the composite part matrix and the second distribution density is applied to a second area of the composite part matrix and the method further includes determining the first distribution density and second distribution density using finite element analysis (FEA).

18. The method of claim 16, further comprising applying pressure to the composite part matrix placed within a die to pressure fill the composite part matrix with a semi-solid or liquid material to form the composite product via infiltration.

* * * * *